(12) United States Patent
Takezawa et al.

(10) Patent No.: US 8,826,769 B2
(45) Date of Patent: Sep. 9, 2014

(54) STEERING DEVICE

(75) Inventors: Naoyuki Takezawa, Gunma-ken (JP); Yoshiyuki Sato, Gunma-ken (JP)

(73) Assignee: Yamada Manufacturing Co., Ltd., Kiryu-Shi, Gunma-Ken (JP)

( * ) Notice: Subject to any disclaimer, the term of this patent is extended or adjusted under 35 U.S.C. 154(b) by 396 days.

(21) Appl. No.: 13/363,299

(22) Filed: Jan. 31, 2012

(65) Prior Publication Data
US 2012/0198956 A1 Aug. 9, 2012

(30) Foreign Application Priority Data

Feb. 4, 2011 (JP) .................................. 2011-23190

(51) Int. Cl.
*B62D 1/18* (2006.01)
*B62D 1/189* (2006.01)
*B62D 1/184* (2006.01)

(52) U.S. Cl.
CPC ................ *B62D 1/184* (2013.01); *B62D 1/189* (2013.01)
USPC .............. 74/493; 280/776; 280/777; 280/778

(58) Field of Classification Search
USPC ...................... 74/493; 280/776, 777, 778, 779
See application file for complete search history.

(56) References Cited

U.S. PATENT DOCUMENTS

| 6,419,269 B1 * | 7/2002 | Manwaring et al. .......... 280/775 |
| 7,322,608 B2 | 1/2008 | Yamamoto et al. |
| 7,354,068 B2 * | 4/2008 | Ishida et al. ................... 280/775 |
| 8,596,161 B2 * | 12/2013 | Maniwa et al. ................. 74/493 |
| 2005/0225068 A1 * | 10/2005 | Ishida et al. ................... 280/775 |
| 2005/0268739 A1 * | 12/2005 | Sato et al. ........................ 74/492 |
| 2008/0202276 A1 * | 8/2008 | Harris et al. ..................... 74/493 |
| 2011/0185839 A1 * | 8/2011 | Inoue ............................... 74/493 |
| 2011/0203403 A1 * | 8/2011 | Maniwa et al. ................. 74/493 |
| 2011/0271787 A1 * | 11/2011 | Marable et al. ................. 74/493 |
| 2013/0087006 A1 * | 4/2013 | Ohtsubo et al. ................ 74/493 |

FOREIGN PATENT DOCUMENTS

| JP | 2004-189152 (A) | 7/2004 |
| JP | 2008-162422 A | 7/2008 |

OTHER PUBLICATIONS

Japanese Office Action dated Jun. 3, 2014.

* cited by examiner

*Primary Examiner* — Toan To
(74) *Attorney, Agent, or Firm* — McGinn IP Law Group, PLLC (57) ABSTRACT

A steering device includes an outer column including fastening pieces formed to face each other at both sides, in the width direction, of a slot portion formed at either of a lower side or an upper side of an embracing body portion along an axial direction thereof, a fixed bracket clamping the outer column, a fastener that fastens the outer column and the fixed bracket, an inner column, and a pushing member having an expanding shaft portion. The two fastening pieces of the embracing body portion are connected by the fastener so that the two fastening pieces can be expanded and contracted, and the expanding shaft portion is elastically biased in an axial center direction of the outer column so as to abut on end zones of the slot portion and expand the two fastening pieces.

9 Claims, 6 Drawing Sheets

STEERING DEVICE

BACKGROUND OF THE INVENTION

1. Field of the Invention

The present invention relates to a steering device in which when adjustment is performed in a telescopic adjustment mechanism, the release of fastening of an inner column by an outer column can be smoothly performed, whereby effective telescopic adjustment can be realized.

2. Description of the Related Art

A large number of steering devices equipped with a tilt-telescopic mechanism have been used. In particular, in manually operated devices, the outer column clamps the outer peripheral surface of the inner column from both sides in a substantially diametric direction, the clamping pressure is increased by a fastener constituted by a bolt shaft and an operation lever, and the inner column is strongly fixed to the outer column. Where the fastener is loosened, the clamping pressure is decreased, while the portion of the outer column that clamps the inner column is opened, the inner column can easily move in the axial direction with respect to the outer column, and telescopic adjustment can be performed.

Such a telescopic adjustment mechanism is disclosed in Japanese Patent Application Publication No. 2008-162422. Thus, Japanese Patent Application Publication No. 2008-162422 discloses a structure in which a spring member SPG in the form of a coil spring or a plate spring is disposed inside the slit 2b of the column 2 (see FIG. 7 of Japanese Patent Application Publication No. 2008-162422). Further, the steering column mechanism of Japanese Patent Application Publication No. 2008-162422 has a structure in which the energy is absorbed in a secondary collision by the relative movement of the inner column 1 and outer column 2 in the axial direction.

Where the operation lever 13 is rotated in a predetermined direction, the opposing cam surfaces of the cam mechanism 12 are stuck, thereby generating an axial force acting on the clamp bolt 18 and shifting a pair of tilt brackets 3 toward each other (see FIG. 2 in Japanese Patent Application Publication No. 2008-162422). Where a pair of tilt brackets 3 is shifted toward each other, the slit 2b of the outer column 2 is impelled in the closing direction. Therefore, the inner diameter of the outer column 2 decreases and therefore a pressure is applied to the outer periphery of the inner column 1 and an adequate friction force is generated.

Since the spring member SPG is disposed inside the slit 2b of the outer column 2, part of the slit 2b is impelled in the opening direction, the fastening force of the outer column 2 is changed, regardless of the axial force of the clamp bolt 18, and the friction force on the contact surface of the inner column 1 and the outer column 2 is adjusted. As a result, the amount of energy absorbed in a secondary collision is adjusted.

SUMMARY OF THE INVENTION

Where the driver is the same, the initial tilt-telescopic adjustment is rarely performed again, and unless new drivers drive the car, the adjustment is not conducted often. Fastening of the inner column 1 with the outer column 2 is usually used in a state of fastening with the clamp bolt 18. Therefore, the width of the slit 2b of the outer column 2 is almost always in a narrow state, which the exception of cases when a telescopic operation is performed.

When the outer column 2 is made from an aluminum alloy, where a small width of the slit 2b of the outer column 2 is maintained over a long period, the narrow state is maintained due to the properties of the metal. In other words, even if the clamp bolt 18 of the fastener is loosened to release the fastening, the portion of the outer column 2 that fastens the inner column 1 is unlikely to expand from the narrow state thereof. Therefore, when telescopic adjustment is performed, the friction force becomes equal to or greater than the adequate force, the inner column 1 cannot be smoothly moved in the axial direction, and the telescopic adjustment cannot be comfortably performed.

In order to resolve this problem, Japanese Patent Application Publication No. 2008-162422 discloses a structure in which the spring member SPG is disposed within the slit 2b of the outer column 2 so that an elastic force is created in the expansion direction (axial direction of the clamp bolt 18) of the outer column 2. The fastening and fixing are then held, while generating a resistance for (counter force) to the fastening force during telescopic adjustment. Thus, the elastic force of the spring member SPG reaches a maximum when the spring member is compressed to a maximum limit during fastening and fixing, and the elastic force is maintained in this state.

When the fastening is released, the outer column 2 is expanded by the restoring force of the spring member SPG. However, the restoring force of the spring member SPG changes according to the opening degree of the outer column, and when there is a difference in dimensions, a spread appears in the restoring force and a constant restoring force is difficult to maintain. Further, due to the spread in the restoring force of the spring member SPG caused by the difference in dimensions, it is difficult to adjust the friction force of the outer column 2 and the inner column 1 during fastening and fixing.

Thus, within the framework of the conventional technology it is difficult to adjust the friction force of the outer column 2 and the inner column 1 to an adequate range during fastening and release operations performed in telescopic adjustment, fit the lever operation load during fastening in an adequate range, and ensure good telescopic operability. Further, since the spring member SPG, which is a separate member, is used, the number of parts is increased and assembling ability is degraded. It is an object of (technical problem to be solved by) the present invention to provide a steering device in which telescopic adjustment can be performed effectively and smoothly with a very simple configuration.

The results of the comprehensive research conducted by the inventors with the object of resolving the above-described problems have demonstrated that the aforementioned object can be attained by a steering device according to the first aspect of the invention that includes an outer column constituted by an embracing body portion, a slot portion formed at either of a lower side or an upper side of the embracing body portion along an axial direction thereof, and fastening pieces formed at the embracing body portion to face each other at both sides of the slot portion in a width direction thereof; a fixed bracket having a fixed side portion clamping the outer column from both sides in the width direction; a fastener that fastens both fastening pieces of the outer column and both fixed side portions of the fixed bracket; an inner column clamping the outer column; and a pushing member having an expanding shaft portion, wherein the two fastening pieces of the embracing body portion are connected by the fastener so that the two fastening pieces can be expanded and contracted; and the expanding shaft portion is elastically biased in an axial center direction of the outer column so as to abut on end zones of the slot portion and expand the two fastening pieces.

The second aspect of the invention that resolves the aforementioned problem resides in the steering device according to the first aspect, wherein the pushing member is provided with a spring portion that elastically biases the expanding shaft portion at both ends, in the width direction, of the expanding shaft portion. The third aspect of the invention that resolves the aforementioned problem resides in the steering device according to the first or second aspect, wherein the expanding shaft portion is formed to have a peak-like shape.

The fourth aspect of the invention that resolves the aforementioned problem resides in the steering device according to any one of the first, second, and third aspect, wherein a guide portion expanding outwardly is formed on an inner side of each end zone of the two fastening pieces. The fifth aspect of the invention that resolves the aforementioned problem resides in the steering device according to the fourth aspect, wherein a stopper surface protruding inward is formed on a rear side of the guide portion.

In the first aspect of the invention, the expanding shaft portion of the pushing member is elastically biased in the axial center direction of the outer column so as to abut on end zones of the two fastening pieces of the outer column and expand the two fastening pieces. Therefore, when locking is released, a correct gap can be ensured between the outer column and the inner column for telescopic operation. As a result, the inner column that is embraced by the embracing body portion can move smoothly in the axial direction with respect to the outer column and the telescopic operability is improved.

Further, as described hereinabove, because of a configuration in which the pushing member is elastically biased in the axial direction of the outer column, the elastic biasing force acting upon the two fastening pieces enables a substantially constant state of pushing the pushing member against the end zones of the two fastening members, either during locking or during lock released. Therefore, when the fastening operation is performed from a lock release state, the force offering resistance to the fastening operation of the fastener is prevented from being too large or too small, a constant fastening force created by the fastener can be ensured at all times, and telescopic operability can be improved.

In the second aspect of the invention, the pushing member is configured to have a spring portion as means for elastically biasing the expanding shaft portion to both sides of the expanding shaft portion in the width direction. Therefore, the pushing member can be imparted with a function of expanding the fastening pieces and a function of preventing the steering wheel from falling down under gravity when the lock is released during the tilt-telescopic operation. Further, by forming the expanding shaft portion and the spring portions integrally in the pushing member it is possible to decrease the number of parts and assembly operations, thereby reducing cost.

In the third aspect of the present invention, the expanding shaft portion of the pushing member is formed to have a peak-like shape. Therefore, the two fastening pieces of the embracing body portion can be pushed and expanded uniformly to the left and to the right, and the telescopic adjustment can be performed with higher effectiveness, without a significant difference between a contact pressure of one fastening pieces and that of the other fastening pieces. Further, when the expanding shaft portion is formed as a circular-arc peak, the expanding shaft portion has a substantially arch-like shape and the entire structure has high strength and durability.

Further, when the expanding shaft portion of the pushing member is formed to have a triangular or trapezoidal peak shape, the expanding shaft portion has a wedge-like shape and a force pushing and expanding the two tightening pieces of the embracing body portion is increased. Therefore, the telescopic adjustment can be performed smoother and with good effectiveness. In the fourth aspect of the present invention, a guide portion constituted by an inclined surface expanding outwardly is formed on the inner side of each end zone of the two fastening pieces of the outer column. Therefore, the guide portions serve as guides for the expanding operation performed by the pushing member, and smooth expansion of the two fastening pieces is facilitated.

Furthermore, the elastic biasing force acting when the pushing member abuts on the two guide portions can be divided at all times and with good balance into a force directed toward the axial center of the outer column and a force trying to expand the two fastening pieces, thereby making it possible to obtain stable operation feeling.

In the fifth aspect of the present invention, the guide portions of the two fastening pieces have formed therein a stopper surface which protrudes inward of the protruding piece at the rear side of the inclined surface and upon which the pushing member can abut. As a result, the pushing member is prevented from getting out of the guide portion and stable expanding operation can be performed at all times.

DESCRIPTION OF THE PREFERRED EMBODIMENTS

An embodiment of the present invention will be explained below with reference to the appended drawings. In the present invention, a front-rear direction is set, and after the steering device in accordance with the present invention has been mounted on a vehicle, the sites corresponding to the front side on the vehicle will be described with the adjective "front" and the sites corresponding to the rear side on the vehicle will be described with the adjective "rear", where the front-rear direction of the vehicle is taken as a reference. Further, the width direction (left-right direction) in the present invention is a horizontal direction perpendicular to the front-rear direction.

Figure 1A:
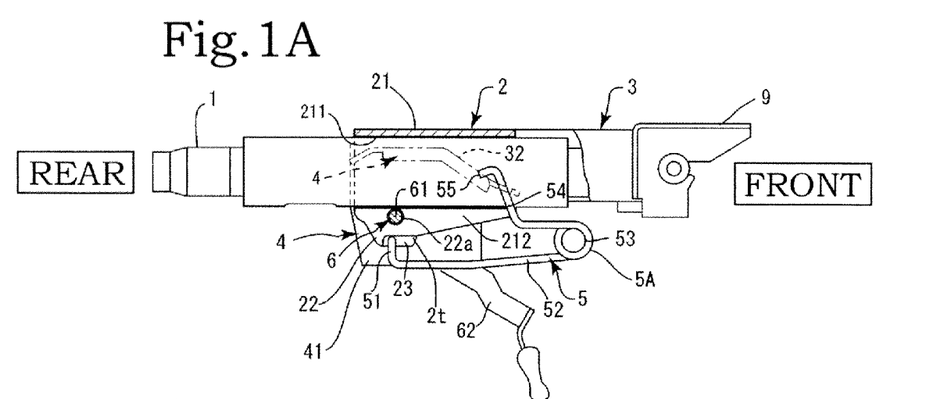
FIG. 1A is a principal side view with a partial cross section in accordance with the present invention.
Figure 1B:
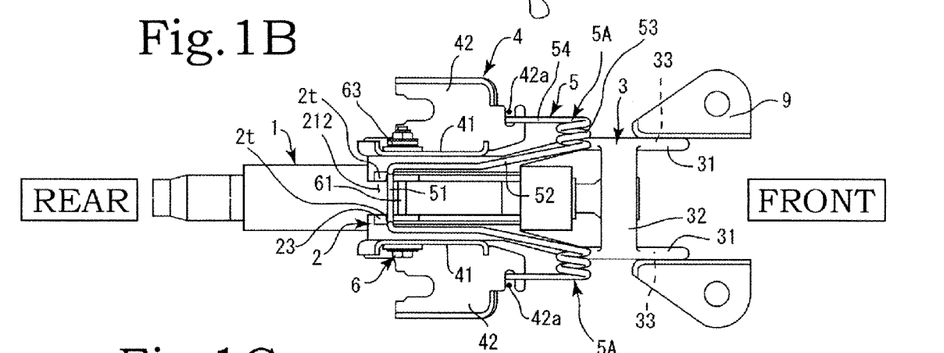
FIG. 1B is a lower view in which the principal portion of the configuration in accordance with the present invention is seen from below.
Figure 1C:
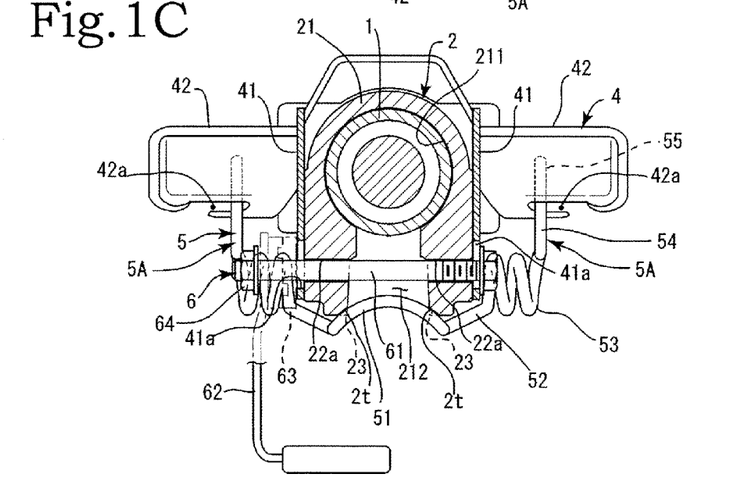
FIG. 1C is a principal vertical sectional front view.

As shown in FIG. 1, the main configuration in accordance with the present invention is constituted by an inner column 1, an outer column 2, a fixed bracket 4, a fastener 6, and a pushing member 5. Where fastening by the fastener 6 is released during telescopic adjustment, the inner column 1 is free to move in the front-rear direction with respect to the outer column 2. A steering shaft (not shown in the figure) is rotatably mounted on the inner column 1.

The outer column 2 is mainly made from an aluminum alloy and, as shown in FIG. 1 and FIG. 2, mainly constituted by an embracing body portion 21 and two fastening pieces 22. The embracing body portion 21 is formed in a substantially cylindrical shape and the interior thereof has an inner peripheral surface portion 211 formed in a hollow shape. The embracing body portion serves to embrace the inner column 1. A slot portion 212 is formed at the lower side, in the diametric direction, of the embracing body portion 21.

The slot portion 212 is a portion where the entire or substantially entire embracing body portion 21 is split from the front side to the rear side in the axial direction and formed in a substantially slit-like shape extending along the axial direction of the embracing body portion 21 (see FIGS. 1B, 1C, 2A, and 2B). The two ends of the slot portion 212 in the width direction are parallel (inclusive of substantially parallel) to each other, and therefore the distance therebetween is the same (inclusive of substantially same) along the axial direction.

The slot portion 212 can be also referred to as an opening between two fastening pieces 22. In the configuration of the outer column 2, the slot portion 212 can be also formed on the upper side. In this case, the two fastening pieces 22 are also formed above the outer column 2.

Figure 2A:
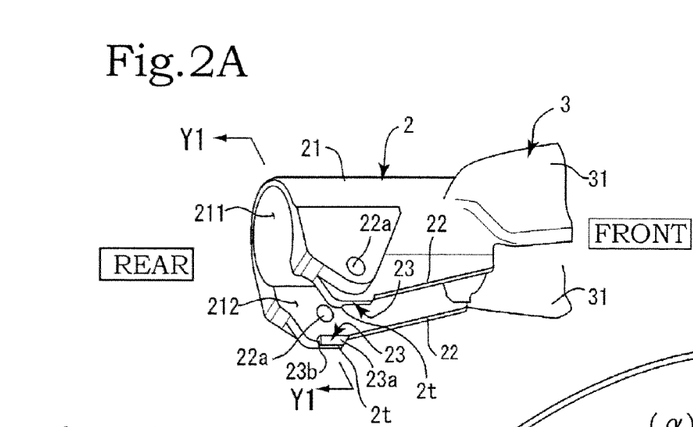
FIG. 2A is a perspective view of the outer column in accordance with the present invention.
Figure 2B:
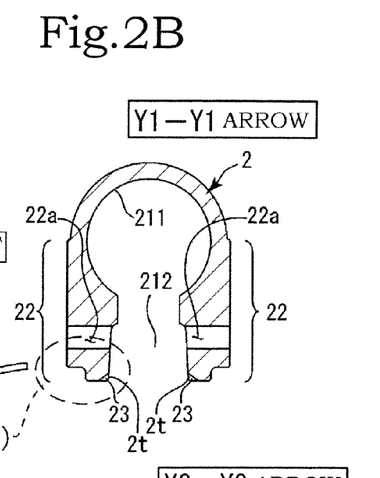
FIG. 2B is a cross-sectional view taken along the Y1-Y1 arrows in FIG. 2A.
Figure 2C:
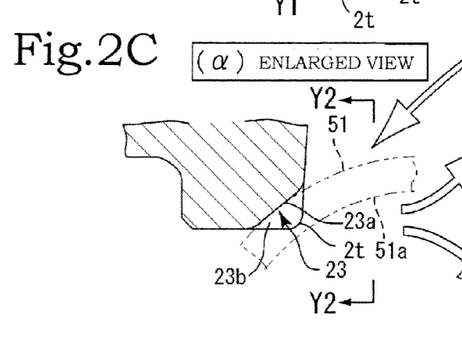
FIG. 2C is an enlarged view of the (α) portion shown in FIG. 2B.
Figures 2D, 2E, 2F:
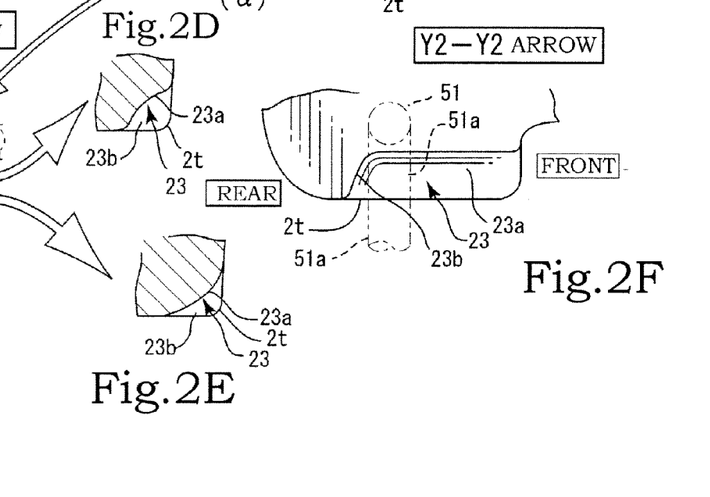
FIG. 2D is an enlarged view of the principal portion illustrating a modification example of the inclined surface of the guide portion.
FIG. 2E is an enlarged view of the principal portion illustrating another modification example of the inclined surface of the guide portion.
FIG. 2F is a view taken along the arrowed Y2-Y2 in FIG. 2C.

The two fastening pieces 22 are formed at the lower side, in the diametric direction, of the embracing body portion 21 at both sides, in the width direction, of the slot portion 212 (see FIGS. 2A and 2B). The two fastening pieces 22 are formed to have the same shape of substantially thick plates, and the longitudinal direction thereof is along the axial direction of the outer column 2. The two fastening pieces 22 are disposed with left-right symmetry and parallel to each other in the width direction of the slot portion 212 and formed integrally with the embracing body portion 21.

Each of the fastening pieces 22 is formed in a quadrangular shape or triangular shape, when viewed from the side surface side along the axial direction of the embracing body portion 21 (see FIG. 1A). The surfaces of the two fastening pieces 22 on the outer side in the width direction are substantially flat surfaces and configured such that when clamped by two fixed-side portions 41 of the below-described fixed bracket 4, the outer side surfaces of the fastening pieces 22 can be in surface contact (inclusive of substantially surface contact) with the fixed-side portions 41.

Fastening holes 22a are formed in the two fastening pieces 22 in the direction perpendicular to the front-rear direction of the outer column 2 and along the width direction of the embracing body portion 21. A bolt shaft 61 of the below-described fastener 6 is inserted into the fastening holes 22a. At the front side of the embracing body portion 21 in the front-rear direction, an arm section 3 constituted by two arm portions 31 and a shaft support portion 32 is formed as shown in FIG. 1B. In the arm portions 31, pivot through holes 33 are formed for pivotal connection, with a freedom of swinging, to a lower bracket 9 for tilting. Recesses may be provided in several locations on the outer side surface of the fastening pieces 22 with consideration for a casting scheme and weight reduction.

Guide portions 23 that will abut on expanding shaft portion 51 of the below-described pushing member 5 are formed at the lower end of the two fastening pieces 22 and close to the locations where the fastening holes 22a are formed (see FIG. 2A). Two side edges in the opening of the slot portion 212 will be referred to herein as end zones 2t. More specifically, in FIG. 1C and FIG. 2B, these zones are edges at the lower end locations of the two fastening pieces 22 that face each other at both sides in the width direction of the slot portion 212. When the slot portion 212 and the two fastening pieces 22 are positioned on the upper side of the outer column 2, the aforementioned end zones 2t become edges of the upper end zones of the two fastening pieces 22 that face each other at both sides in the width direction of the slot portion 212 (see FIG. 6B).

The guide portion 23 is constituted by an inclined surface 23a and a stopper surface 23b (see FIGS. 2A to 2F). The inclined surfaces 23a are formed at inner, mutually opposite surfaces of the fastening pieces 22, so as to have substantially rectangular shapes extending in the front-rear directions with respect to the respective fastening pieces 22. The two inclined surfaces 23a are formed in a substantially chamfered shape that opens so that the spacing in the width direction increases outward and downward from the respective inner side surfaces of the fastening pieces 22.

When viewed from the front side of the vehicle body, the two inclined surfaces 23a appear to be formed to expand so that the gap therebetween has an inverted "V" shape that expands downward. In other words, the two inclined surfaces 23a are inclined to expand from the slot portion 212 side outward in the width direction of the outer column 2 (see FIG. 2B). The inclined surfaces 23a are formed to have a cross section in the form of linear inclined surfaces (see FIGS. 2C and 2D), or concave circular-arc surfaces (see FIG. 2D), or convex circular-arc surfaces (see FIG. 2E).

The stopper surface 23b is formed to protrude in the direction perpendicular (inclusive of substantially perpendicular) to the inclined surface 23a at the rear end side of both inclined surfaces 23a. The stopper surface 23b is formed on the vehicle rear side with respect to the inclined surface 23a. The guide portion 23 is preferably formed in the vicinity of the through holes 22a for fastening. Further, it is preferred that the inclined surface 23a and the stopper surface 23b be formed continuously by a circular-arc surface.

The fixed bracket 4 is constituted by fixed side portions 41 and an upper surface portion 42 (see FIG. 1B and FIG. 10). Support holes 41a are formed in the fixed side portions 41. The support holes 41a are formed as elongated holes extending in the up-down direction. Further, the upper surface portion 42 serves to mount the fixed bracket 4 with a fixing tool such as a bolt on a predetermined position of the vehicle body. Stop holes 42a for attaching the pushing member 5 are formed in the upper surface portion 42.

The fixed bracket 4 clamps both outer side surfaces of the outer column 2 by both fixed side portions 41 and is set so that the positions of the fastening holes 22a of the outer column 2 coincide with those of the support holes 41a of the fixed bracket 4. The bolt shaft 61 of the below-described fastening tool 6 passes therethrough (see FIGS. 1B and 1C). A shock absorbing means is provided on the upper surface portion 42 of the fixed bracket 4. Capsule members that clamp the upper surface portion 42 and are fixed with bolts to the vehicle body and a short absorbing member that deforms plastically when absorbing a shock are used as the shock absorbing means. The fastening tool 6 is constituted by the bolt shaft 61, an operation level portion 62, a fastening cam 63, and a fastening nut 64.

The fastening tool 6 is mounted by the operation lever portion 62, fastening cam 63, and fastening nut 64. By performing the operation of fastening the operation lever portion 62 of the fastening tool 6, it is possible to reduce the diameter of the inner peripheral side surface portion 211 of the embracing body portion 21 and fasten and lock fix the inner column 1 that is accommodated and mounted on the inner peripheral side surface portion 211 (see FIG. 1C). Further, by rotating the operation lever portion 62 of the fastening tool 6 and releasing the fastened state, it is possible to increase the diameter of the inner peripheral side surface portion 211 of the embracing body portion 21, release locking of the inner column 1, and perform tilt telescopic adjustment.

Figure 3A:
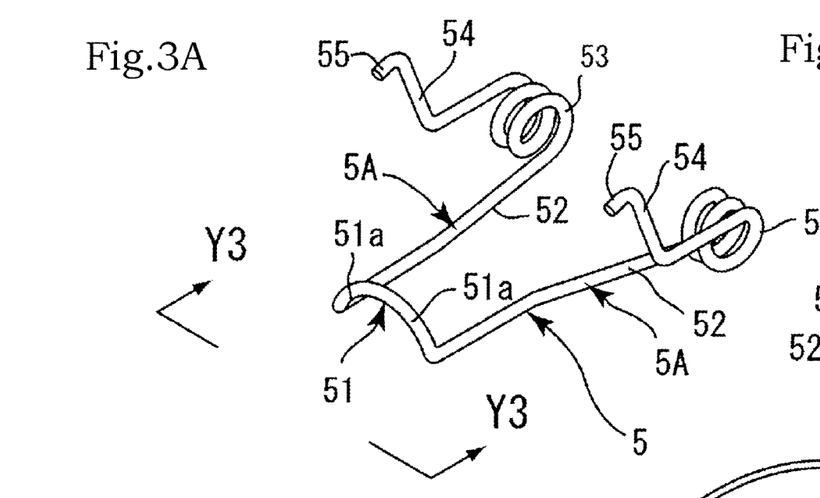
FIG. 3A is a perspective view of the pushing member in accordance with the present invention.
Figure 3B:
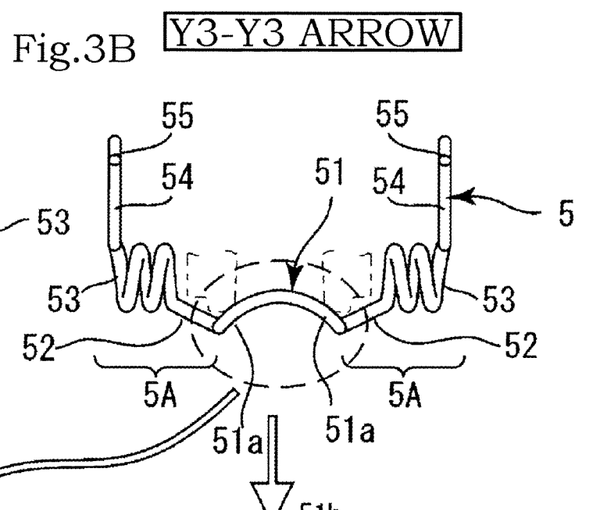
FIG. 3B is a view of the pushing member taken along the arrow Y3-Y3 in FIG. 3A.

The pushing member can be implemented in a plurality of embodiments. In the first embodiment, as shown in FIGS. 3A and 3B, spring portions 5A are formed at both sides, in the width direction of the expanding shaft portion 51. The spring portion 5A serves as a means for elastically biasing the expanding shaft portion 51 upward.

In the spring portion 5A, first elastic shaft portions 52 are formed to extend rearward from the front side of the expanding shaft portion 51, return coil spring portions 53 are formed with a left-right symmetry at front axial ends of the two first elastic shaft portions 52, second elastic shaft portions 54 are formed rearward from the two return coil spring portions 53 toward the expanding shaft portion 51, and locking shaft portions 55 are formed to extend upward from the rear axial ends of the two second elastic shaft portions 54.

The expanding shaft portion 51 and the spring portion 5A are formed from a metal shaft material, and the expanding shaft portion 51 and the spring portion 5A are formed integrally. The expanding shaft portion 51 is formed as a circular-arc peak protruding upward and has a shape corresponding to the inclined surfaces 23a formed at both fastening pieces 22. The expanding shaft portion 51 has a shape with left-right symmetry in the width direction and has left-right symmetrical inclined shaft pieces 51a (see FIGS. 3B, 3C, 3D). The two inclined shaft pieces 51a are formed as circular arcs of a substantially semispherical shape (see FIGS. 3A and 3B).

Figure 3C:
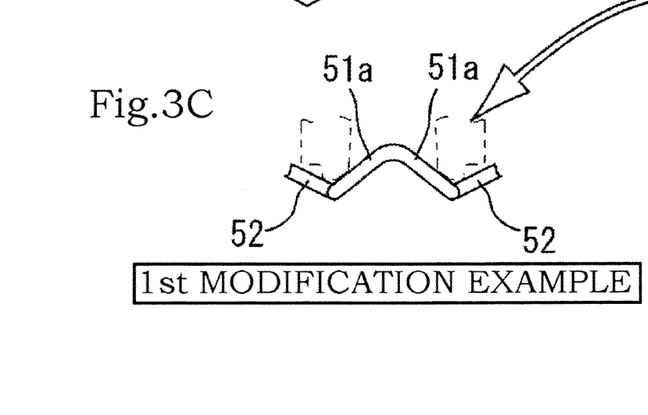
FIG. 3C is a front view of the first modification example of the expanding shaft portion of the pushing member.
Figure 3D:
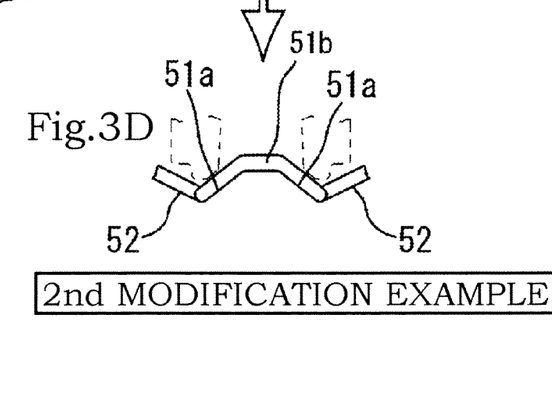
FIG. 3D is a front view of the second modification example of the expanding shaft portion of the pushing member.

In a modification example of the expanding shaft portion 51, the two inclined shaft pieces 51a are formed to obtain a substantially inverted "V" shape or a triangular peak shape (see FIG. 3C). In a second modification example of the expanding shaft portion 51, a horizontal shaft piece 51b is formed in the intermediate sections of the two inclined shaft pieces 51a to obtain a trapezoidal shape (see FIG. 3D). The two inclined shaft pieces 51a of the expanding shaft portion 51 abut on the end zones 2t of the two fastening pieces 22 of the outer column 2 and serve to expand the two fastening pieces 22. It is thus preferred that the expanding shaft portion 51 have a shape corresponding to the two inclined surfaces 23a.

In the configuration in which the pushing member 5 is mounted on the fixed bracket 4, the expanding shaft portion 51 substantially bridges or spans between the end zones 2t of the two fastening pieces 22 of the outer column 2, the first elastic shaft portions 52, second elastic shaft portions 54, and both return coil spring portions 53 are positioned on the outer side in the width direction of the two fastening pieces 22, and the locking shaft portions 55 are locked and fixed to the locking holes 42a of the upper surface portion 42 of the fixed bracket 4 (see FIGS. 1B and 1C). Further, the expanding shaft portion 51 abuts on the end zones 2t (at the lower ends) of the two fastening pieces 22 and has a function of pushing the outer column 2 and the inner column 1 upward and preventing the steering wheel from moving downward under gravity during tilting operation.

The expanding shaft portion 51 of the pushing member 5 abuts on the guide portions 23 formed in the (end zones 2t of the) two fastening pieces 22 of the outer column 2. Since the expanding shaft portion 51 abuts on the guide portions 23, the abutment state of the two fastening pieces 22 and the expanding shaft portion 51 is in the form of surface contact (see FIGS. 2C and 2D). Therefore, the expanding shaft portion 51 smoothly and moderately expands the two fastening pieces 22, while elastically pushing them upward. Furthermore, since the expanding shaft portion 51 abuts on the two stopper surfaces 23b, the optimum abutment positions of the expanding shaft portion 51 and the end zones 2t of the two fastening pieces 22 are maintained, and these optimum abutment positions are prevented from shifting to the rear side of the vehicle body.

Figures 4A, 4B:
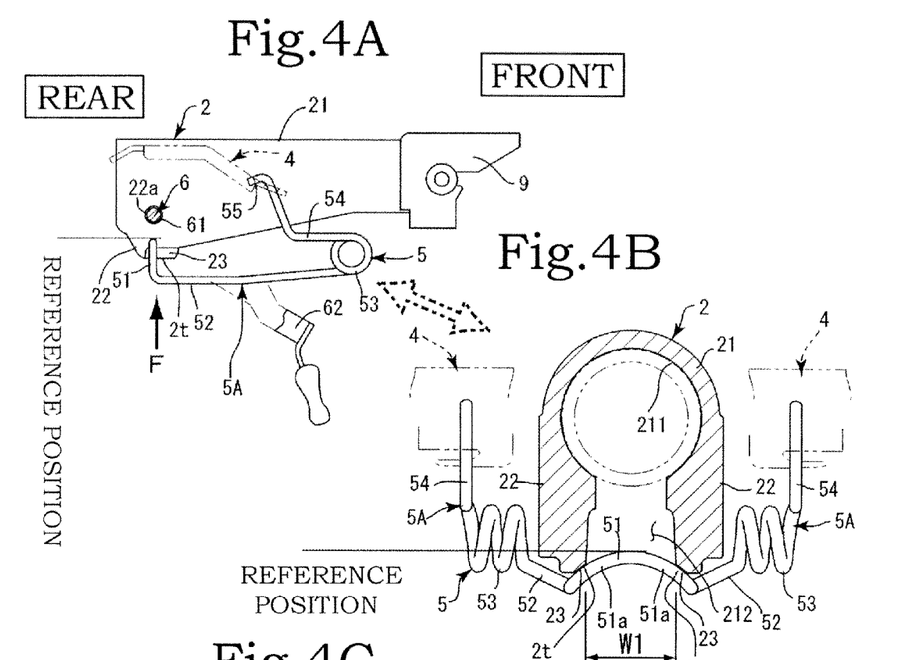
FIG. 4A is a side view illustrating the state of the outer column and the pushing member when the outer column is fastened.
FIG. 4B is a vertical sectional front view illustrating the state of the outer column and the pushing member when the outer column is fastened.

The operations performed when the telescopic adjustment of the outer column 2 is performed by the pushing member 5 will be explained below. First, the two inclined shaft pieces 51a of the expanding shaft portion 51 of the pushing member 5 are in a state of constant abutment on the end zones 2t at the lower ends of the two fastening pieces 22 under the effect of an elastic biasing force F (see FIGS. 4A and 4B). The position of the uppermost portion of the expanding shaft portion 51 of the pushing member 5 at this time is referred to as a reference position.

Figure 5:
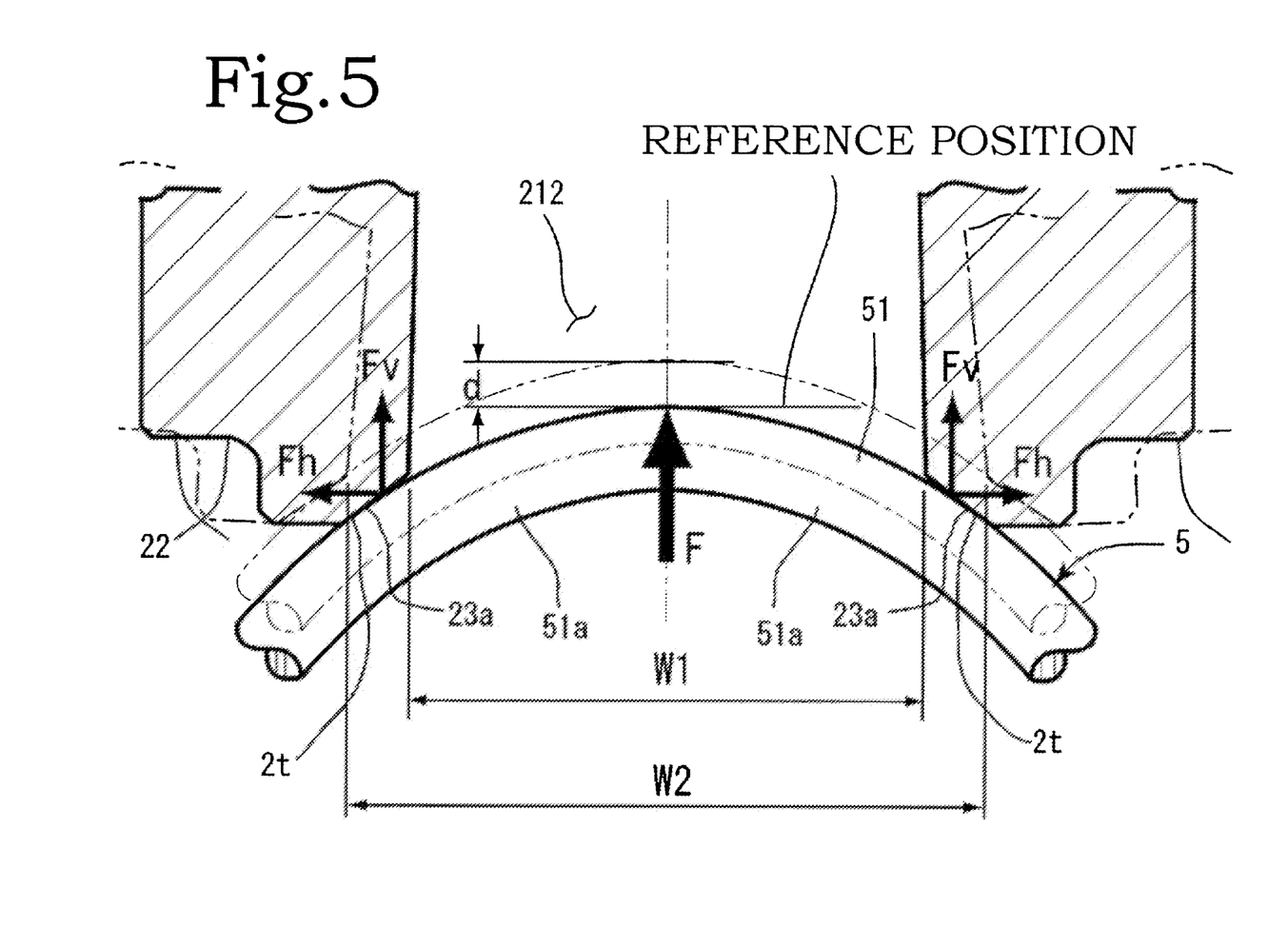
FIG. 5 is a principal enlarged view of the outer column illustrating the operation state in which the force of the expanding shaft portion of the pushing member is applied to the two fastening pieces.

The elastic biasing force F is distributed to the two inclined shaft pieces 51a of the expanding shaft portion 51 to provide a biasing force F distributed to the inclined surfaces 23a of the two guide portions 23, and the two inclined shaft pieces 51a abut obliquely on the two inclined surfaces 23a (see FIG. 5). The biasing forces distributed in such oblique abutment state are transmitted by the two inclined surfaces 23a to the two fastening pieces 22. In these distributed biasing forces, a vertical force component Fv acts upward and a horizontal force component Fh acts in the width direction on the fastening piece 22 via the inclined surface 23a (of the guide portion 23) (see FIG. 5).

The operation lever portion 62 of the fastener 6 is then rotated to release the fastening. As a result, the fastening of the two fixed side portions 41 of the fixed bracket 4 and the two fastening pieces 22 of the outer column 2 is relaxed (see FIGS. 4C and 4D). Substantially at the same time, the two inclined shaft pieces 51a of the expanding shaft portion 51 apply horizontal force components Fh to (the end zones 2t of) both fastening pieces 22 via the inclined surfaces 23a of both guide portions 23, and the embracing body portion 21 is expanded in the horizontal diametric direction about the slot portion 211 of the outer column 2 as a center.

Figures 4C, 4D:
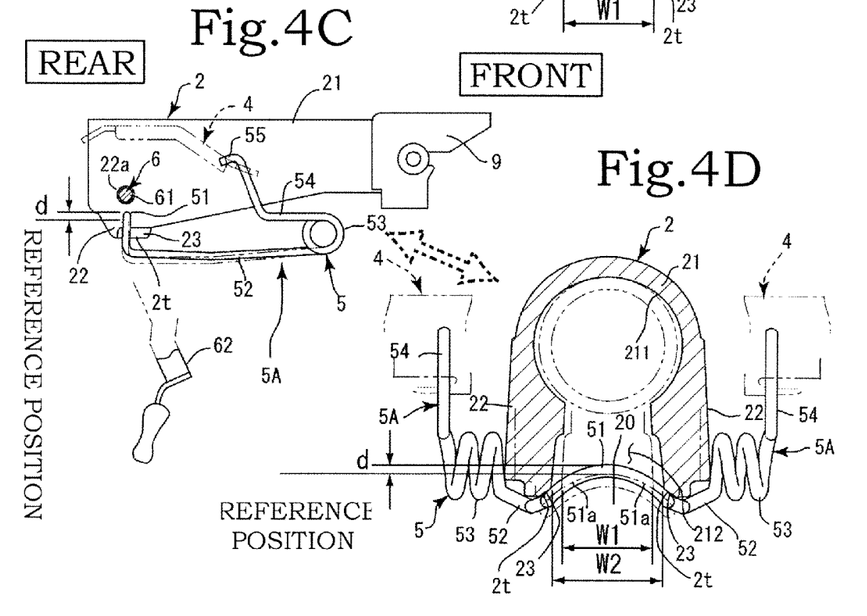
FIG. 4C is a side view illustrating the state of the outer column and the pushing member when the fastening of the outer column is released.
FIG. 4D is a vertical sectional front view illustrating the state of the outer column and the pushing member when the fastening of the outer column is released.

As a result, at the same time as the fastening with the fastener 6 is released, the expanding shaft portion 51 of the pushing member 5 rises by d above the reference position, the embracing body portion 21 of the outer column 2 expands in the width direction (horizontal diametric direction), the inner column 1 mounted on the embracing body portion 21 of the outer column 2 becomes free to slide in the axial direction, and the telescopic adjustment can be rapidly performed.

Where the state in which the inner column 1 mounted on the outer column 2 is telescopically locked (fixed) in the axial direction is maintained over a long period, the inner diameter of the embracing body portion 21 is difficult to enlarge even if the fastener 6 is loosened. In other words, the fastened state of the outer column 2 is maintained. To resolve this problem, in accordance with the present invention, the two fastening pieces 22 of the outer column 2 can be forcibly expanded by performing a fastening release operation of the fastener 6.

As a result, a gap between the outer periphery of the inner column 1 and the inner peripheral surface portion 211 of the outer column 2 that is necessary during the telescopic operation can be ensured, and degradation of operability can be prevented. Further, the pushing member 5 generates an upward elastic biasing force F at all times and the outer column 2 and the inner column 1 are prevented from falling down during the tilt-telescopic adjustment.

Further, since the gap between the outer column 2 and the inner column 1 can be made small during the initial setting, the gap can be prevented from getting too large when the fastening of the inner column 1 by the fastener 6 is released, and a play can be reduced. With the configuration in which the pushing member 5 is elastically biased in the axial center direction of the outer column 2 by the elastic biasing means, the elastic biasing force F acting upon the two fastening pieces 22 can maintain a substantially constant state in which the pushing member 5 is pushed against the two guide portions 23 of the two fastening pieces 22 during locking and also during lock release.

Therefore, when the fastening operation is performed from the lock release state, the force acting against the fastening operation of the fastener 6 can be prevented from being too large or too small, a constant fastening force created by the fastener 6 can be ensured at all times, lever operability during locking can be prevented from degrading, and telescopic operability can be improved. Further, in accordance with the present invention, as described hereinabove, the pushing member 5 combines two functions, namely, a function of ensuring a gap between the inner column 1 and the inner peripheral surface portion 211 of the outer column 2 during telescopic operation and a function of preventing the steering wheel from falling down under gravity during tilt-telescopic operation. Therefore, the number of parts in the steering device is decreases and the number of assembling operations is also reduced.

Figure 6A:
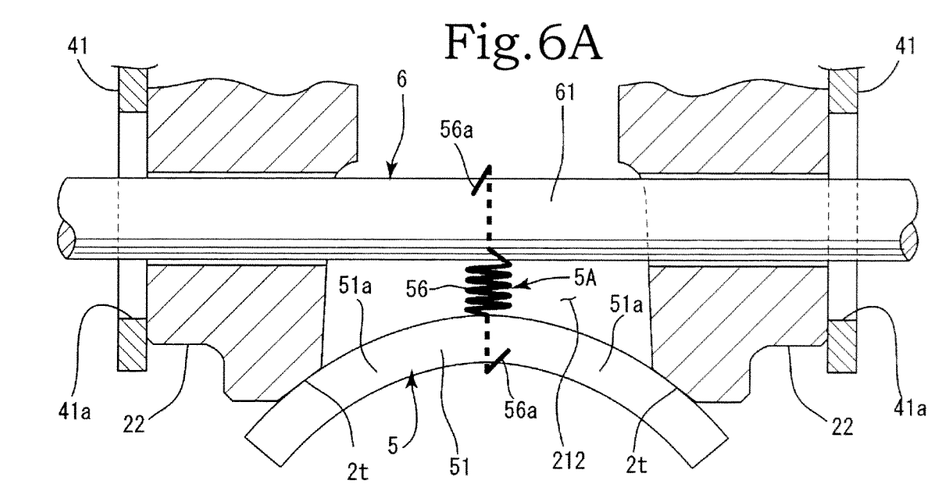
FIG. 6A is a principal enlarged view in accordance with the present invention that is provided with the second embodiment of the pushing member.

There is a second embodiment of the pushing member 5. In this embodiment, as shown in FIG. 6A, the expanding shaft portion 51 and the spring portion 5A constituting the expansion are configured as separate members. As described hereinabove, the expanding shaft portion 51 has a shape with left-right symmetry in the width direction and has the inclined shaft pieces 51a symmetrical in the left-right direction. The two inclined shaft pieces 51a are formed as circular-arc peaks of a substantially semicircular shape, and a circular arc symmetrical in the left-right direction is constituted by the two inclined shaft pieces 51a.

There are also various modification examples of the expanding shaft portion 51 in the pushing member 5 of the second embodiment. Thus, the two inclined shaft pieces 51a can be formed as a peak of a substantially inverted "V"-like shape or triangular shape in the same manner as in the first embodiment, or a horizontal shaft piece 51b can be formed between the two inclined shaft pieces 51a to provide for a trapezoidal shape in the second modification example of the expanding shaft portion 51. Further, a tension coil spring 56 constituted by a member separate from the expanding shaft portion 51 can be used as the spring portion 5A. Hooks 56a are formed at both ends, in the extension-contraction direction, at the tension coil spring 56.

Figure 6B:
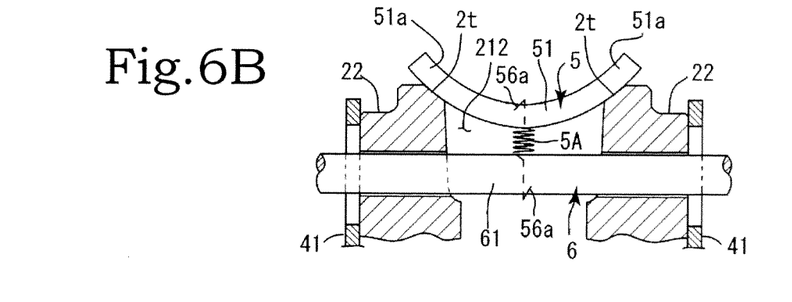
FIG. 6B is a principal view of the configuration in which the pushing member of the second embodiment is provided at the outer column in which the slot portion and the two fastening pieces are positioned on the upper side.

Further, one hook 56a is hooked to the bolt shaft 61 of the fastener 6, and the other hook 56a is connected to the expanding shaft portion 51. The connection of the expanding shaft portion 51 and the hook 56a is made strong. In such a case, the expanding shaft portion 51 is elastically biased at all times in the axial center direction of the outer column 2 by the compressive coil spring 56, and the expanding shaft portion 51 abuts on the guide portions 23 at the end zones 2t of the two fastening pieces 22. FIG. 6B is a configuration diagram illustrating an embodiment in which the slot portion 212 is positioned on the upper side of the outer column 2. In this case, the pushing member 5 of the second embodiment is mounted by the tension coil spring 56 on the bolt shaft 61 so as to abut on the end zones 2t at the upper ends of the opposing two fastening pieces 22 at both sides, in the width direction, of the slot portion 212.

In a state in which the fastening is released by the operation of the operation lever 62 of the fastener 6, the expanding shaft portion 51 of the pushing member 5 is elastically biased and abutted on the end zones 2t of the two fastening pieces 22 by the elasticity of the tension coil spring portion 56, the two fastening pieces 22 are expanded in the width direction, and the inner peripheral surface portion 211 of the embracing body portion 21 expands in the diametric direction about the slot portion 211 as a center.

Thus, the fastening with the fastener 6 can be released, the embracing body member 21 is substantially forcibly expanded in the diametric direction by the expanding shaft member 51 of the pushing member 5, the inner column 1 accommodated in the outer column 2 can smoothly move in the axial direction, and telescopic adjustment can be easily performed. The present invention should not be construed as being limited to the above-described embodiments. For example, the embodiments can be changed and modified as appropriate, for example, the slot portion 212 of the outer column 2 can be provided on the upper side.

What is claimed is:

1. A steering device comprising:
an outer column constituted by an embracing body portion, a slot portion formed at either of a lower side or an upper side of the embracing body portion along an axial direction thereof, and fastening pieces formed at the embracing body portion to face each other at both sides of the slot portion in a width direction thereof;
a fixed bracket having a fixed side portion clamping the outer column from both sides in the width direction;
a fastener that fastens both fastening pieces of the outer column and both fixed side portions of the fixed bracket;
an inner column clamping the outer column; and
a pushing member having an expanding shaft portion, wherein
the two fastening pieces of the embracing body portion are connected by the fastener so that the two fastening pieces can be expanded and contracted; and the expanding shaft portion is elastically biased in an axial center direction of the outer column so as to abut on end zones of the slot portion and expand the two fastening pieces.

2. The steering device according to claim 1, wherein the pushing member is provided with a spring portion that elastically biases the expanding shaft portion at both ends, in the width direction, of the expanding shaft portion.

3. The steering device according to claim 1, wherein the expanding shaft portion is formed to have a peak-like shape.

4. The steering device according to claim 1, wherein a guide portion expanding outwardly is formed on an inner side of each end zone of the two fastening pieces.

5. The steering device according to claim 3, wherein a guide portion expanding outwardly is formed on an inner side of each end zone of the two fastening pieces.

6. The steering device according to claim 4, wherein a stopper surface protruding inward is formed on a rear side of the guide portion.

7. The steering device according to claim 5, wherein a stopper surface protruding inward is formed on a rear side of the guide portion.

8. The steering device according to claim 2, wherein the expanding shaft portion is formed to have a peak-like shape.

9. The steering device according to claim 2, wherein a guide portion expanding outwardly is formed on an inner side of each end zone of the two fastening pieces.

* * * * *